United States Patent Office 2,926,301
Patented Feb. 23, 1960

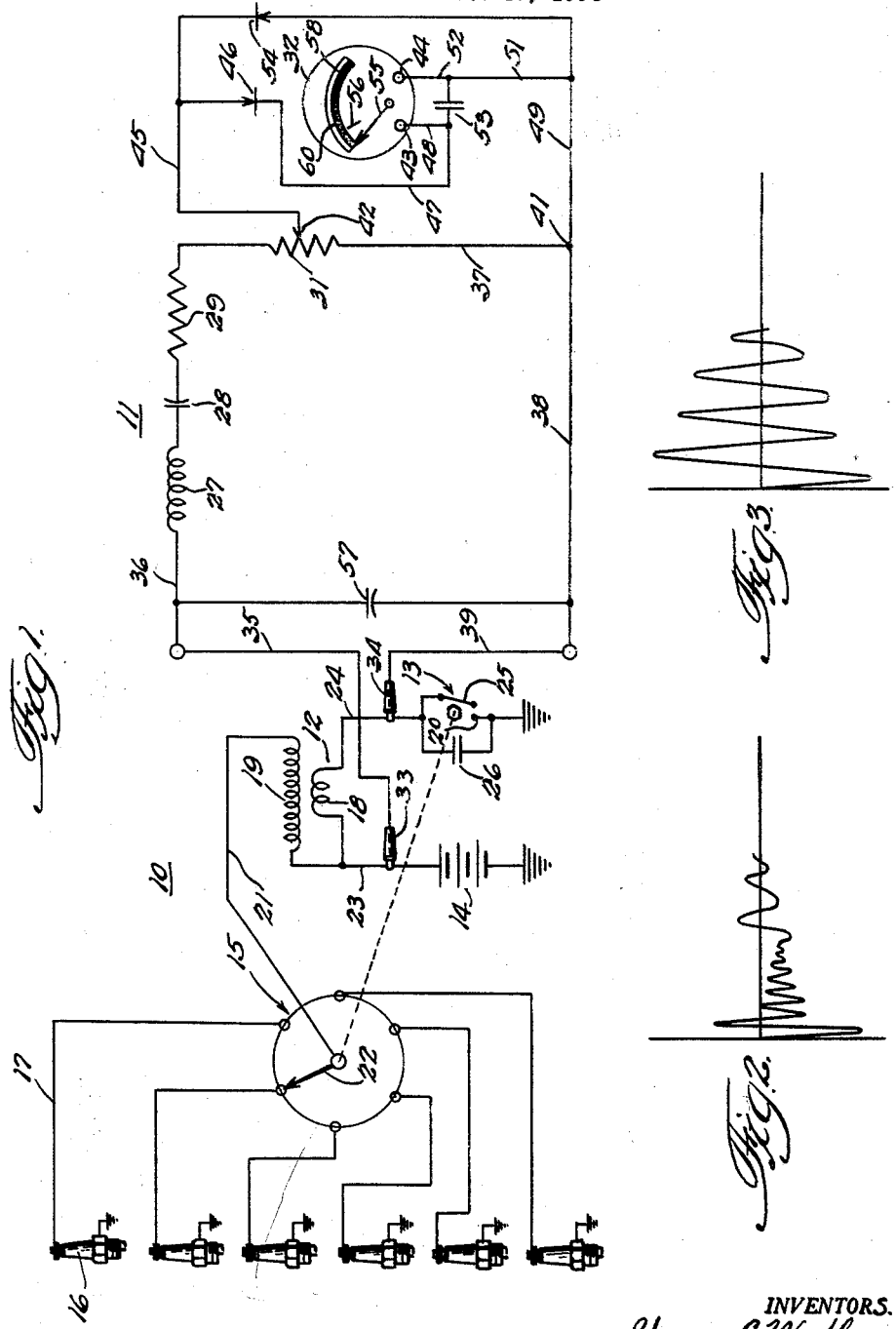

2,926,301

INTERNAL COMBUSTION ENGINE IGNITION SYSTEM TESTING APPARATUS

Vernon C. Westberg, Arlington Heights, and Wilbur W. Thomas, Park Ridge, Ill., assignors to Sun Electric Corporation, Chicago, Ill., a corporation of Delaware Application December 16, 1954, Serial No. 475,688

4 Claims. (Cl. 324—16)

This invention relates to ignition testing units for internal combustion engines, for example, gasoline engines of automobiles or trucks and it is an object of this invention to provide improved apparatus of this character.

Many of the faults in the ignition system of an internal combustion engine including the coil, the distributor and the various leads may be detected by operating the coil with the spark plug leads disconnected, that is to say, with the secondary winding open circuited. Measurements of the voltage across the primary winding or the energy available therein under such open circuit conditions, will provide an indication of the condition of the circuit. If there are turns shorted to each other in either the primary or secondary windings of the coil, turns shorted to the ground in either of these coils or poor insulation areas wherein leakage to ground is taking place, the energy available in the primary winding when the coil is being tested under conditions simulating actual operation, that is, with energy supplied to the primary winding which is being interrupted at regular intervals, will be less because of the energy dissipated through the various fault conditions described. When none of these fault conditions exists, the energy available will be higher. But for making such an open circuit test the coil, ordinarily, must be removed from the internal combustion engine and placed on a test stand and operated. This is inconvenient, time consuming and consequently expensive.

It is a further object of the invention to provide an ignition testing unit of the character indicated which requires a minimum of dismantling of apparatus including disconnection of circuits from the engine whose ignition system is being tested.

It is a further object of this invention to provide an ignition system testing unit of the character indicated which enables the ignition system of an internal combustion engine to be tested for virtually all types of faults while the coil is mounted on its own engine.

Such a test, of course, requires that the engine be running and requires that there be provided some means for distinguishing between correctly and incorrectly firing spark plugs for whatever reason, since the indications of all spark plugs are available to the testing apparatus under these conditions. It is a solution of this problem which forms one basic aspect of the subject invention.

It has been found that when spark plugs are firing normally, which is to say, that all components of the ignition system preceding it are also functioning normally, the frequency of oscillation of current in the primary circuit of the ignition coil is in the range of 8 to 12 kilocycles per second. Likewise, when a spark plug is malfunctioning because of shorted turns or shorts to ground of the coil, for example, the frequency of oscillation in the primary circuit of the coil is in the range of 8 to 12 kilocycles per second. But when the spark plug lead of a properly functioning spark plug and circuit is disconnected, the frequency of oscillation in the primary circuit of the coil is of the order of 2 kilocycles per second. The invention is carried out according to one form thereof by providing a tuned circuit which is responsive to a frequency of 2 kilocycles per second and non-responsive to a frequency of 10 kilocycles per second, midway of the 8–12 kilocycle range. With such a circuit only the lower frequency components are passed to a measuring instrument which thereby provides the desired indication.

It is a further object of the invention to provide apparatus of the character indicated which is economical, efficient, simple and rugged whereby it lends itself readily to the rough and tumble use of service station and garage operators.

For a more complete understanding of the invention reference should be had to the accompanying drawing in which Figure 1 is a schematic diagram of the ignition system of an engine and the circuit of the testing unit;

Fig. 2 is a graph of the voltage in the primary winding of the coil during normal operation thereof; and Fig. 3 is a graph of the voltage in the primary winding of the coil during open circuit of the secondary winding thereof.

Referring more particularly to the drawing, there is shown an ignition system 10 and a testing unit 11 connected thereto.

The ignition system 10 is shown as comprising a coil 12, a periodical circuit breaker 13, a battery 14, a distributor 15, and a series of spark plugs 16, each of which is connected by an appropriate lead 17 to a respective terminal of the distributor.

The coil 12 includes a primary winding 18 and a secondary winding 19, the secondary winding being connected at one terminal through a conductor 21 to a rotor 22 which engages the various terminals of the distributor. The other terminal of winding 19 is shown grounded through conductor 23 and battery 14 and each of the spark plugs 16 is shown grounded in order to complete the secondary circuit. The primary winding is connected at one terminal through conductor 23 to the battery 14 and at the other terminal through conductor 24 to one terminal of the circuit breaker arm 25. The other terminals of the circuit breaker 13 and the battery 14 are shown grounded for completion of the circuit. Connected across the breaker points of the distributor (the free end of arm 25 and stationary contact 20) is a condenser 26 which prevents arcing across the said points.

The testing unit 11 comprises a pickup circuit including the inductor 27, the capacitor 28, and the resistors 29 and 31, and an indicating circuit including the instrument 32. The pickup circuit is connected to the primary coil 18 by means of clips 33 and 34 and the pickup circuit may be traced as follows: from clip 33 through conductors 35 and 36, inductor 27, capacitor 28, resistors 29 and 31, and conductors 37, 38 and 39 to clip 34.

The indicating circuit is connected to the pickup circuit at terminal 41 and an adjustable contact 42. The instrument 32 which may be a D.C. milliammeter is connected by means of its terminals 43 and 44 respectively to movable contact 42 and terminal 41 through the following circuit: from movable contact 42 through conductor 45, rectifier 46 and conductors 47 and 48 to terminal 43 and from terminal 41 through conductors 49, 51 and 52 to terminal 44. A capacitor 53 is connected across the terminals 43 and 44 of the instrument 32 to smooth out current ripples so that the instrument pointer is steady. A further rectifier 54 is connected across the instrument 32 and rectifier 46 to improve the indications given by instrument 32.

The remaining structure and functioning of the apparatus may be understood by considering examples of operating conditions.

During normal operation of the ignition circuit of a particular spark plug, the characteristic wave shape of the voltage existing across the primary coil 18, whenever the circuit breaker 13 opens its contacts, is of the form shown in Fig. 2. The characteristic frequencies involved in this wave shape seem to be in the range of 8 to 12 kilocycles per second, and the amplitude thereof is relatively small. The latter, of course, is to be expected since the energy available is dissipated in the spark plug circuit. Each spark plug when it fires produces a wave shape of the form shown in Fig. 2.

Whenever the circuit of a particular spark plug is open, that is, the secondary winding 19 is open circuited and the circuit is not otherwise faulty, the characteristic wave shape of the voltage existing across the primary coil 18, as the circuit breaker 13 opens its contacts, is of the form shown in Fig. 3. The characteristic frequency involved in this wave shape for most automobile engines is of the order of 2 kilocycles per second and the initial amplitude thereof is relatively large. This latter, of course, is to be expected, since the energy available is dissipated across the circuit breaker points 20 and 25.

The inductor 27 and capacitor 28 form a circuit which is resonant in the vicinity of 2 kilocycles per second and which is far removed from resonance in the range of 8 to 12 kilocycles per second. In one form of apparatus actually constructed, inductor 27 had a value of .098 henrys, capacitor 28 had a value of .065 microfarad, and the resistors 29 and 31 each had values of 300 ohms.

The pickup circuit including the inductor 27 and capacitor 28 which together are tuned to about 2 kilocycles per second will pass frequencies of this order of magnitude to the indicating circuit whereas frequencies of the order of 8 to 12 kilocycles per second will not be passed. These later frequencies are very substantially discriminated against.

When all plugs are firing normally, as described, and the ignition system is to be tested, the clips 33 and 34 are applied to the terminals of primary winding 18 as, for example, at conductors 23 and 24 and the instrument 32 is calibrated. That is to say, the contact 42 is moved along the resistor 31 until the pointer 55 comes to rest at a set point 56. This will be in the lower range of the instrument since the vltage available at the instrument during this condition is low, i.e. the frequency available is 8–12 kilocycles per second and the sensing circuit is tuned to 2 kilocycles per second. The condition of the ignition system including the high tension spark plug lead up to the spark plug itself is then tested by removing the lead from that particular spark plug. This spark plug then does not fire, of course, but, assuming that the spark plug was firing normally prior to the disconnection of the lead, all of the energy available for firing of the plug is now dissipated in the primary circuit of the coil and particularly across the breaker points 20, 25 of the distributor. As a result a high voltage appears across the winding 18 having voltage wave shape of the form shown in Fig. 3, i.e. a frequency of the order of 2 kilocycles per second and is supplied to the pickup circuit 11, a proportional part thereof being supplied to the instrument 32. The inductor 27 and capacitor 28 being tuned to about 2 kilocycles per second pass substantially undiminished, the energy of the said frequency and consequently the meter 32 reads in the upper portion 58 of its scale, thereby indicating a good circuit.

A condenser 57 is provided across conductors 36 and 38 at the input of the pickup circuit in order to reduce somewhat the extreme peaks of voltage which may result under the condition just described.

The oscillation, as shown in Fig. 3, occurs in the primary circuit because of the presence of the condenser 26 and the coil 18 which together form a series resonant circuit having the frequency characteristic shown namely about 2 kilocycles per second.

The energy available in the primary winding 18 when each of the other spark plugs fires normally (having a wave shape according to Fig. 2 and a frequency of from 8 to 10 kilocycles per second) is, of course, also supplied to the pickup circuit 11 while the circuit of a particular spark plug is being tested. The resonant circuit of inductor 27 and capacitor 28, however, being tuned to 2 kilocycles substantially rejects the 8 to 12 kilocycle frequency and thus the energy of the normally firing spark plugs does not reach the instrument 32 in any substantial amount. This is to say, that during operation of the testing unit while the engine is running, only the indications corresponding to the open circuited spark plug are read by the instrument whereas the indications of the normally firing spark plugs are not indicated.

The circuit of each spark plug may be tested in like manner.

Suppose, however, that the coil is faulty, for example, a relatively small number of the secondary turns thereof are either shorted to each other or shorted to ground. Under this condition the engine may operate, but poorly. When now the spark plug lead of a particular spark plug is removed, that is, the external load circuit is opened, the shorted turns of the secondary winding 19 remain as a load on the coil and thus the voltage which appears across the primary winding 18 and also the frequency thereof substantially resembles the condition of these quantities when this spark plug is firing normally. That is, the amplitude of the voltage across the primary and its frequency substantially resembles that shown in Fig. 2, the frequency of the oscillation in the primary circuit as determined by the winding 18 and the condenser 26 being of the order of 8 to 12 kilocycles per second. The pickup circuit of inductor 27 and capacitor 28 being tuned to about 2 kilocycles per second does not pass the 8 to 12 kilocycle frequency and consequently the instrument 32 reads in the lower portion 60 of its scale. This, as already described, indicates that the ignition system is faulty when a spark plug lead is disconnected or the secondary circuit of the coil is otherwise opened. Likewise, if the coil 12 itself is normal but an insulation weakness exists in any of the apparatus beyond the coil including the spark plug lead. In the apparatus according to the invention, short circuits or grounds in the coil, or secondary circuits, etc. appear as a load on the coil insofar as the primary winding of the coil is concerned, the nature of the load being similar to that which the sensing circuit observes when the ignition system is functioning normally. But when the circuit of an individual spark plug is not faulty and the spark plug lead thereof is removed, the load as observed by the sensing circuit is that of open secondary circuit if the circuit is otherwise normal, and is that of normal load if the circuit of that spark plug is faulty.

In the form of apparatus described, the rectifiers 46 and 54 were copper oxide rectifiers and capacitors 53 and 57 had values of 500 microfarads and .15 microfarad, respectively.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Apparatus for testing the individual spark plug circuits of an internal combustion engine having a coil with primary and secondary windings, a distributor connected to the secondary winding, a plurality of spark plugs, leads connecting the spark plugs to the distributor, and means including a circuit breaker connecting the primary winding to a voltage source, said apparatus comprising a test circuit connected across the primary winding of the coil, filter elements connected in the test circuit to block flow of current therein at frequencies induced in the primary winding under normal spark plug operation and to pass current of frequencies induced under open circuit conditions between the secondary winding and a spark plug, and indicating means in the test circuit, the spark plug circuits being tested by individually disconnecting the circuits between the distributor and the individual spark plugs while the engine is running and obtaining individual indications of spark plug circuit conditions on the meter.

2. The apparatus of claim 1 in which the indicating means is a current responsive meter to measure current flow in the test circuit.

3. The apparatus of claim 1 in which the indicating means is a direct current meter connected to the test circuit through a rectifier.

4. The apparatus of claim 3 including a second rectifier connected across the meter and poled oppositely to the first named rectifier.

References Cited in the file of this patent

UNITED STATES PATENTS

| | | |
|---|---|---|
| 1,976,988 | Grangier | Oct. 16, 1934 |
| 2,188,845 | Ramsay | Jan. 30, 1940 |
| 2,381,609 | McCoy | Aug. 7, 1945 |
| 2,450,164 | Ramsay | Sept. 28, 1948 |
| 2,487,070 | Ramsay | Nov. 8, 1949 |